April 29, 1924.

F. H. VAN LOOZEN

WINDSHIELD CLEANER

Filed Jan. 30, 1923

1,491,834

Inventor
Fred. H. Van Loozen

By
Fred E. Billman, Attorney

Patented Apr. 29, 1924.

1,491,834

UNITED STATES PATENT OFFICE.

FRED H. VAN LOOZEN, OF LAKEWOOD, OHIO, ASSIGNOR OF ONE-HALF TO JACOB MANDEL, OF CLEVELAND, OHIO.

WINDSHIELD CLEANER.

Application filed January 30, 1923. Serial No. 615,848.

*To all whom it may concern:*

Be it known that I, FRED H. VAN LOOZEN, a citizen of the United States, residing at Lakewood, in the county of Cuyahoga and State of Ohio, have invented certain new and useful Improvements in Windshield Cleaners, of which the following is a specification.

My invention relates to improvements in wind-shield cleaners for use in connection with self-propelled vehicles. The present embodiment of the invention is particularly designed and adapted for use in connection with motor vehicles and is adapted to be thrown into and out of engagement with some convenient continuously driven or moving element, such for example,—as the fan belt of the power or operating plant of the vehicle while in motion, or while such power plant is running.

The primary object is to provide a generally improved device of the class mentioned which will be exceedingly simple in construction, cheap of manufacture and efficient in use.

A further and very important object is the provision of a device of this class which may be readily attached to wind-shield frames and the fan belt of power plants of vehicles of widely varying form, type, location, and the like.

A still further and very important object is the provision of improved means for mounting and actuating the window cleaning element or wiper including reciprocatory flexible connections and improved driving gearing adapted to be thrown into and out of engagement with a continuously driven or moving element of the vehicle, such as the fan belt, so that the window cleaning element may be controlled manually and automatically operated through power derived from the operating or power plant of the vehicle.

With the above mentioned and other ends in view, the invention consists in the novel construction, arrangement and combination of parts, hereinafter described, illustrated in one of its embodiments in the accompanying drawings and particularly pointed out in the appended claims.

Figure 1:
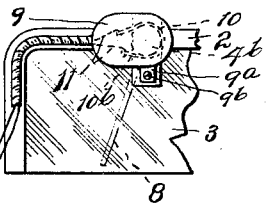

Referring to the drawings, forming a part of this specification, Figure 1 is a fragmentary side elevation of a wind-shield cleaning device, constructed in accordance with this invention, and applied to a fixed portion of the power plant and fan belt and the wind-shield of an ordinary automobile.

Figure 2:
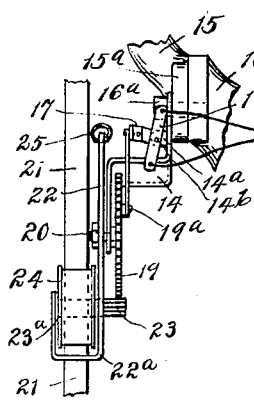
Figure 3:
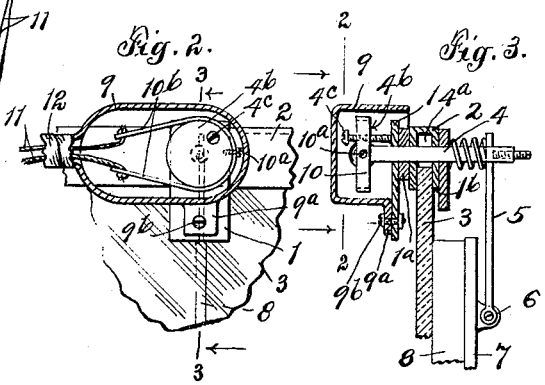

Fig. 2, an enlarged rear elevation, partly in section, of the bracket support and wiper and wiper actuating gearing attached to the wind-shield, taken on line 2—2 of Fig. 3.

Fig. 3, a central vertical sectional view of the same taken on line 3—3 of Fig. 2.

Figure 4:
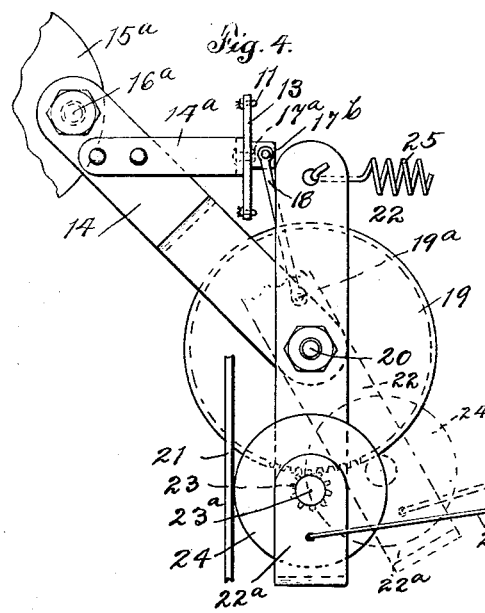

Fig. 4, an enlarged fragmentary front elevation of the relatively movable and fixed supporting bracket and fan belt driven gearing for driving the wiper actuating mechanism for throwing the latter out of operation by the driver or chauffeur of the vehicle.

Figure 5:
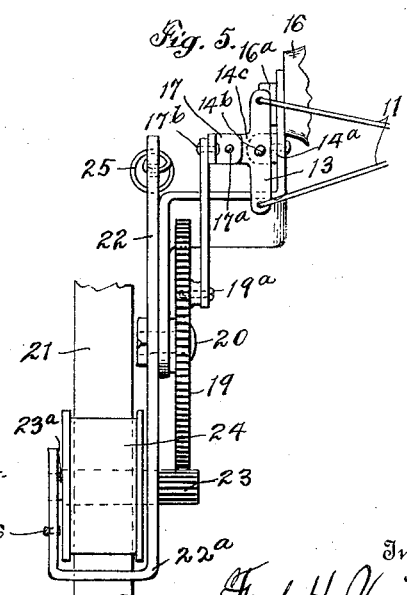

Fig. 5, a side elevation of the same.

Similar numerals of reference designate like parts throughout all the figures of the drawings.

The improved wind-shield cleaner and cleaner actuating and controlling mechanism is adapted to be connected to and driven from any suitable and convenient continuously moving or driven element of the vehicle, but for convenience in attaching to self-propelled vehicles equipped with a motor or power plant including a fan and fan belt, I have shown the present embodiment of my invention mounted upon a fixed portion of the vehicle or power plant in suitable proximity to the fan belt with suitable mechanism adapted to be thrown into and out of engagement with said fan belt by the chauffeur and adapted to be driven from the fan belt in actuating the wind-shield cleaning element or wiper.

The improved wind-shield cleaner comprises a suitable support or attaching bracket 1, adapted to be attached to the side of the wind-shield, in the present instance, to the upper member of the wind-shield frame 2, which carries the transparent element or glass 3. The support may comprise the inner and outer clamping members $1^a$ and $1^b$, respectively, on opposite sides of the wind-shield frame, the latter being provided with an opening adapted to register with openings in the clamping members $1^a$ and $1^b$ to removably receive and contain a reciprocatory member in the specific form of a rock shaft 4. The rock shaft 4 is provided on its outer side with an opening $4^a$, adapted to removably receive and contain an adjustable arm 5, pivotally connected at one end to a bearing head 6, of a cross arm 7, the latter carrying the rubber windshield cleaning element 8, in the specific form of a squeegee. The arm 5 is adapted to be adjusted by means of a set screw 5ª.

As a means of regulating the tension of the window cleaning element 8 upon the front of the glass 3 and also as a means of regulating the sensitiveness of such mechanism in the reciprocatory movement, the inner end of the rock shaft 4 is provided with a head 4ᵇ, (in the present instance in the specific form of a wheel) the latter being provided with an adjusting screw 4ᶜ, bearing against the main bracket 1. As a means of covering the actuating head 4ᵇ and its connections as well as excluding dust therefrom, a casing or housing 9, is provided, said housing 9 being provided with a lug 9ª secured, in the present instance, to the support 1 by means of an attaching bolt or element 9ᵇ.

As a means of positively reciprocating the window cleaning element thru the rock shaft 4 and the head 4ᵇ, the latter is provided with a loop member 10, secured by means of an attaching element 10ª, the loop being provided with oppositely arranged and extending members 10ᵇ, and the members 10ᵇ being connected to oppositely arranged reciprocatory flexible connections or members 11. The flexible members 11 are arranged within a flexible sheath 12.

As a means of reciprocating the flexible connections 11 to correspondingly reciprocate the window cleaning element through the connections referred to, a rocker 13 is pivotally mounted on a bracket 14. In the present instance the bracket 14 is provided with a supplemental bearing bracket 14ª, provided with a bearing element 14ᵇ. The bracket 14 is held in a relative fixed position and mounted on some relatively fixed portion of the vehicle or power plant, as for example,—one of the connecting lugs or brackets 15ª, of the connection 15 connected to a fixed portion of the cylinder head 16. In such instance the common connecting bolt 16ª for uniting these parts may be utilized, as shown most clearly in Figs. 4 and 5 of the drawings.

As a means of actuating the rocker 13 with its connections, said rocker is provided with an arm 14ᶜ, the latter being provided with a loosely connected bracket or bearing member 17, adapted to swing on a bearing pin 17ª, one end of the bearing bracket 17 being provided with a second bearing pin 17ᵇ, connected to a connecting rod 18. The rod 18 is connected to a driving gear 19, through the medium of a bearing member 19ª, and the gear 19 is mounted on a bearing bolt 20, connected to the outer end of the relatively fixed bracket 14.

As a means of driving the gear 19 from the fan belt 21 (or other continuously moving element of the vehicle), the bearing bolt 20 at the end of the relatively fixed bracket is provided with a pivotally mounted movable bracket or rocker 22, having at one end an overturned or loop portion 22ª, provided with a bearing shaft 23ª, carrying a belt engaging friction pulley 24. The shaft 23ª is adapted to be driven by the pulley 24 when the latter is in engagement with the belting 21 and one end of the bearing shaft 23ª is provided with a pinion 23, meshing with the gear 19.

As a means of normally holding the friction pulley 24 into contact with the moving element or belt 21 and also adapting such pulley to adapt itself and conform to any slack in the belt, one end of the rocker 22 is provided with a tension spring 25, suitably connected, and as a means of enabling the driver or chauffeur of the vehicle to operate the wind-shield cleaner manually and as desired, the outer or free end of the rocker 22 is provided with a connecting link or element 26, leading to the instrument board of the vehicle and suitably connected whereby in one position the belt-engaging pulley 24 and its connections may be held in the dotted line position shown in Fig. 4 and out of contact with the belting or when released will be brought into the belt engaging position through the action of the spring 25.

Having thus described one of the embodiments of my invention, without having attempted to set forth all the forms in which it may be made, or all the modes of its use, what I claim and desire to secure by Letters Patent is,—

1. In a wind-shield cleaner, a support attached to a wind-shield, a shaft on said support provided with a rocker head and an arm carrying a window cleaning element, means for adjusting said shaft and window cleaning element transversely of the wind-shield, reciprocatory cables connected to said rocker head to oscillate said shaft and window cleaner element, and means for reciprocating said cables.

2. In a wind-shield cleaning device, a support attached to the wind-shield, a rock shaft on said support, an adjustable arm on said rock shaft provided with a window cleaning element, a spring moving said rock shaft longitudinally in one direction, a rocker head on said rock shaft provided with means for adjusting the latter against the resistance of said spring, and reciprocatory flexible cables connected to said rocker head.

3. A wind-shield cleaner, comprising a support secured to the wind-shield, a window cleaning element supported thereby for movement over the glass of said wind-shield, a shaft, a rocker head carried by said shaft, reciprocatory flexible connections leading to said rocker head, a continuously rotating driving mechanism, a rocker driven by the latter and connected to said reciprocatory flexible connections, and means for bringing said continuously rotating driving mechanism into and out of engagement with a continuously moving element of the vehicle.

4. In a wind-shield cleaner, the combination with a wind-shield, an attaching bracket at one side of said wind-shield, and a rock shaft carried by said bracket and provided with an arm carrying a wind-shield cleaning element, a spring between said arm and said bracket and surrounding said rock shaft, a rocker head on the opposite end of said rock shaft, an adjusting device on said rocker head for adjusting said arm and window cleaning element toward and from said wind-shield, flexible cables connected to said rocker head, and means for operating said flexible cables.

5. In combination with the fan belt and the wind-shield of an automobile, a support adapted to be attached to the side of the glass of said wind-shield, a reciprocatory member provided with a window cleaning element, a head for reciprocating said element, flexible elements for reciprocating said head, a bracket provided with a rocker connected to said flexible elements, said bracket being connected to a fixed portion of the vehicle, a gear having a connecting rod adapted to operate said rocker, a pinion and fan belt pulley said pinion meshing with said gear wheel, a movable bracket for said pinion and fan belt pulley, and means for manually moving said main bracket and pinion and fan belt pulley into and out of engagement with the fan belt.

6. In a wind-shield cleaning device for vehicles including a continuously moving vehicle element, an attaching bracket attached to the wind-shield and provided with a rock shaft, an arm carried by said shaft and provided with a wind-shield cleaning element, a head on said rock shaft, oppositely arranged reciprocatory cables connected to and adapted to reciprocate said head, a rocker connected to said cables, a fixed bracket for supporting said rocker, a gear on said bracket provided with a connecting rod actuating said rocker, a spring resisted rocker on said fixed bracket carrying a friction pulley and a pinion adapted to actuate said gearing, and means for manually moving said pulley into and out of engagement with a continuously moving element of the vehicle.

7. A wind-shield cleaner for automobiles and the like, comprising a reciprocatory window cleaning element, means for securing the same in proximity to the portion of the window to be cleaned, a flexible tubular sheath provided with flexible internal cables for reciprocating said window cleaning element, a relatively fixed bracket provided with a rocker connected to said flexible cables to reciprocate the same in opposite direction, a spring resisted movable bracket provided with a belt engaging pulley and a pinion, a gear on said fixed bracket meshing with said pinion and provided with a connecting rod operating said rocker, and manually operable means for moving said movable bracket and belt engaging pulley into and out of engagement with the fan belt of the vehicle.

8. In a wind-shield cleaning device for vehicles, an attaching bracket adapted to be attached to the wind-shield and provided with a rock shaft, an arm mounted on one end of said shaft and provided with a wind-shield cleaning element, a head on the opposite end of said rock shaft, oppositely arranged reciprocatory flexible connections connected to and adapted to reciprocate said head, a rocker connected to said connections, a relatively fixed bracket for supporting said rocker, a gear on said bracket provided with a connecting rod adapted to actuate said rocker, a friction pulley provided with a pinion adapted to actuate said gear, and means for supporting and manually moving said friction pulley into and out of engagement with a continuously moving element of the vehicle.

In testimony whereof I have affixed my signature.

FRED H. VAN LOOZEN.